Patented Nov. 14, 1939

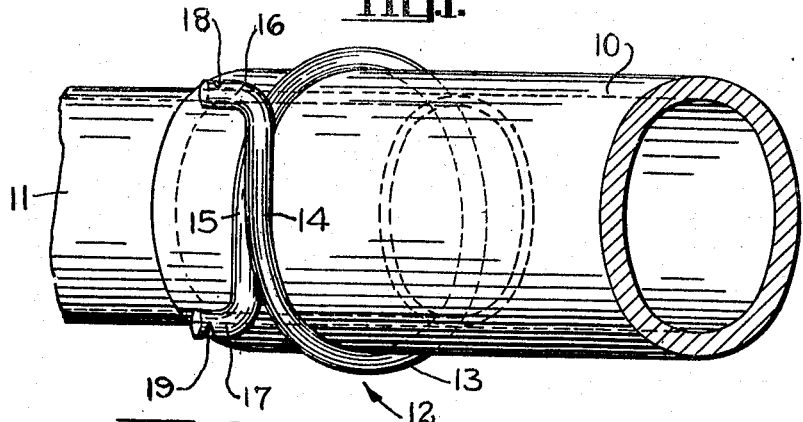
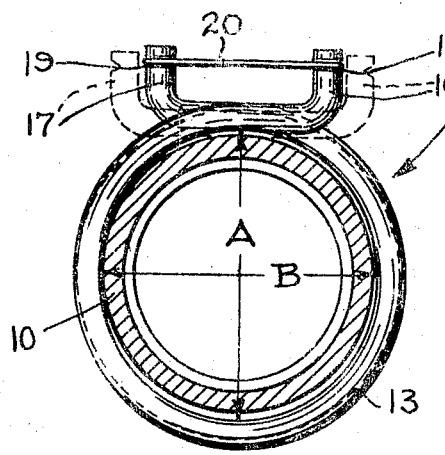
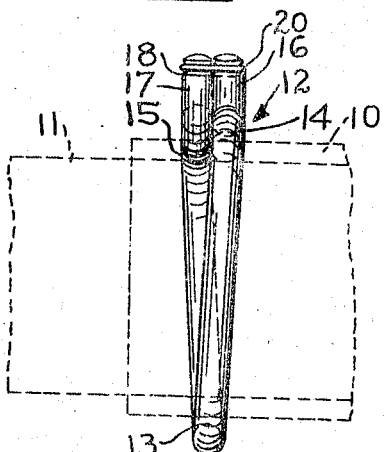
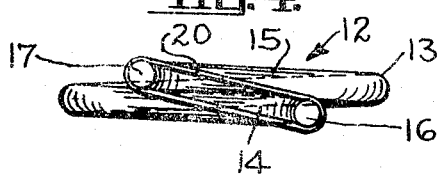
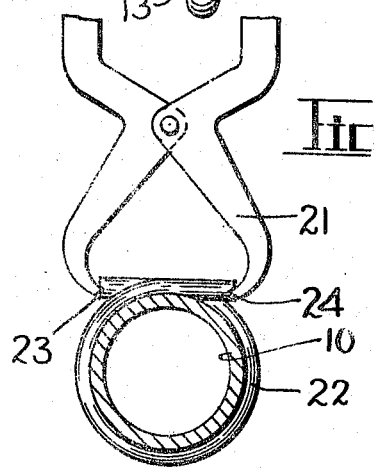

2,180,271

UNITED STATES PATENT OFFICE 2,180,271

HOSE CLAMP

Damiano Arras, New Britain, Conn.

Application March 9, 1939, Serial No. 260,833

3 Claims. (Cl. 24—256)

This invention relates to hose clamps, and more particularly to a self-locking hose clamp which is adjustable to fit hose of various diameters, and hold it tightly on an interior fitting.

Most of the hose clamps now in common use are tightened upon the fitting by screws or bendable clamping tongues.

One object of the present invention is to provide a hose clamp of the above nature which will automatically clamp the hose upon the interior fitting by cutting a wire loop, which originally holds the clamp in spread-apart open position after said clamp has been slipped over the hose and moved to any desired location on the length thereof.

Another object is to provide a hose clamp of the above nature which is adapted to close into tight clamping contact upon a hose by its own tension to securely hold said hose upon a fitting.

A further object of this invention is to provide an improved hose clamp of the above nature which will be relatively inexpensive to manufacture, simple in construction, compact, flexible to permit expansion and contraction under varying heat conditions, ornamental in appearance, and very efficient and durable in use.

With these and other objects in view, which will appear as the description proceeds, there have been illustrated in the accompanying drawing two forms in which the invention may be conveniently embodied in practice.

In the drawing:

Fig. 1 is a perspective view showing a hose clamp embodying this invention at its appears in actual use surrounding a hose and fitting.

Fig. 2 is an end view of the same.

Fig. 3 is a side view of the same,—the hose and fitting being shown by dotted lines.

Fig. 4 is a top view of the clamp per se.

Fig. 5 is a view of a modified form of clamp as it appears in closed position ready to be spread apart to open position by a pair of tongs.

Referring now to the drawing wherein like reference numerals designate like parts throughout the several views, the numeral 10 denotes one end of a flexible rubber hose herein shown surrounding an interior sleeve or fitting 11 in position to be clamped thereto by the improved hose clamp of this invention, which is indicated in its entirety by the numeral 12. The hose clamp 12 is preferably made of high carbon steel wire of any desired cross-section, and is herein shown as comprising a ring-shaped body portion 13 of circular cross-section having overlapping intermediate portions 14 and 15 and upstanding spaced apart ends 16 and 17.

The wire clamp is first formed slightly smaller in diameter than the outside diameter of the hose, as indicated in dotted lines in Fig. 2. It is then heat-treated to produce a spring temper therein, so that when it is spread to the full line or open hose-engaging position shown in Fig. 2, it will exert a strong force tending to close the clamp. The clamp will be held in such spread-apart condition by a closed elongated loop 20 of soft easily cut wire of small diameter,—the ends of said loop being engaged in a pair of notches 18 and 19 formed in the outer sides of the upstanding ends 16 and 17 of said clamp.

After the clamp has been slipped over the hose to the desired position as shown in Fig. 1, the loop 20 may be easily cut, as by a pair of pliers, not shown, or by filing and the compressive action of the strong wire of the clamp will exert a strong pressure upon the hose, gripping it tightly upon the fitting. The clamp so formed is preferably then chrome or nickel plated to prevent rusting.

The operation of pressing the ends 16 and 17 of the clamp toward each other increases the internal diameter of the body portion 13 in such a manner that the clamp 12 is vertically elongated or slightly oval in shape. The vertical diameter A is slightly greater than the horizontal diameter B when in such open position.

Operation

In operation, after slipping the spread-apart loop-retained hose clamp 12 over the end 10 of the hose, the hose in turn is slipped over the end of the fitting 11 into the desired position. The loop 20 will then be severed by filing it or cutting it with pliers. This permits the clamp 12 to automatically spring into closed position, as indicated in dotted lines in Fig. 2, and as shown in full lines in Fig. 1, whereby the end 10 of the hose will be evenly engaged about its periphery and securely clamped to the fitting 11, the clamp forming a perfect circle when in closed position, and being slightly smaller in diameter than said hose. It will thus be seen that the clamp will evenly and tightly compress the hose against the fitting end 11 with considerable force, preferably from 25 to 75 pounds, this force being dependent upon the size of wire and the spring tension of the clamp.

From the above it is obvious that an efficient self-tightening hose clamp has been provided which is not dependent upon the use of screws or other form of adjusting members to apply it in clamped condition upon the end of a hose. By the use of the releasable loop 20 of small wire, the hose clamp may be shipped to the consumer in its largest diameter open condition ready for instant use. A pair of tongs 21 or the like may be efficiently used to again press the ends 16 and 17 together to release the clamp 12 from its clamping position about the hose, and if desired, a new loop 20 may be again slipped over the ends 16 and 17 of the clamp into the notches 18 and 19 to retain the removed clamp in its open position ready for future use when again desired.

In the form of the invention shown in Fig. 5, the ends of the modified hose clamp 22 are not turned up, but are formed tangent to the loop and provided with notches 23, 24 for receiving the elongated wire loop 20. The operation of this form of the invention is similar to that of the first form.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a hose clamp, a single loop of spring-tempered wire, the mid-portion of which is in the form of a substantially circular body preformed to a smaller diameter than the hose to be clamped, said loop having opposed juxtaposed overlapping end sections lying in a plane tangent to said circular body portion at the point of overlapping, whereby when the extremities of said loop are pressed together by a pair of tongs or pliers, the body of said ring will be vertically elongated and spread away from said hose.

2. In a hose clamp, a single loop of spring-tempered wire, the mid-portion of which is in the form of a substantially circular body preformed to a smaller diameter than the hose to be clamped, said loop having juxtaposed overlapping end sections lying in a plane tangent to said circular body portion at the point of overlapping, to provide at least a 360° contact with the hose, the outer ends of said end sections extending outwardly from said circular body portion beyond the overlapping point so as to cause said loop to spread away from the hose without binding when the extremities thereof are pressed together with a tool for adjusting and removing said clamp.

3. In a device for adjustably clamping a soft rubber hose upon a rigid interior tube, a spring tempered single loop of wire of relatively heavy metal stock, the mid-portion of said loop comprising a substantially circular body, the ends of said body being in juxtaposed overlapping relation to provide at least a 360° contact, the extremities of said loop lying outside a plane tangent to said circular body at the point of overlapping, and a severable loop of soft wire engaging said extremities to initially hold said ring in expanded condition without binding said hose.

DAMIANO ARRAS.